United States Patent Office 3,473,609
Patented Oct. 21, 1969

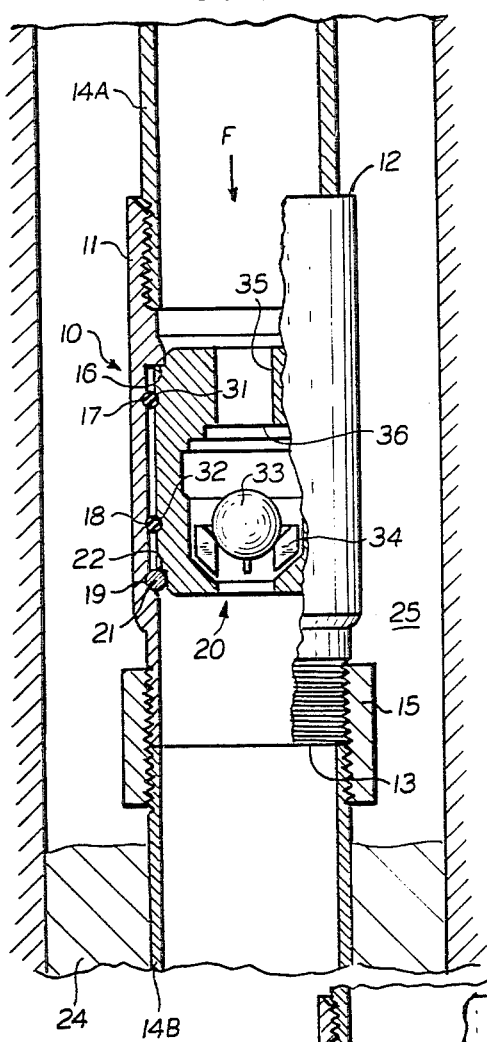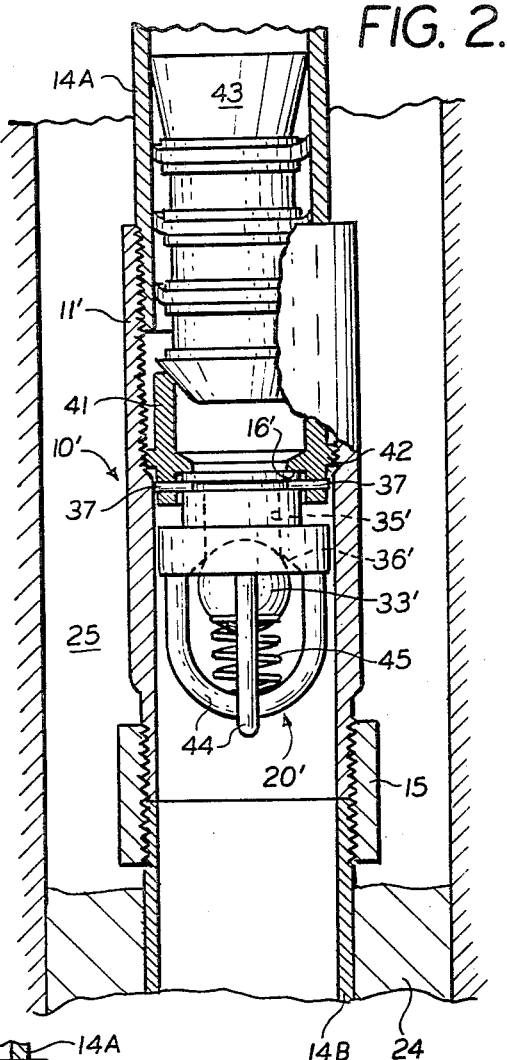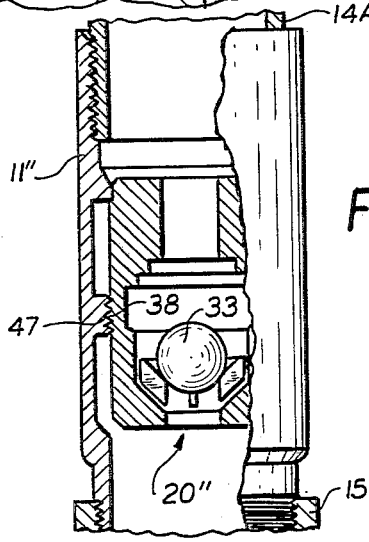

3,473,609
FLOAT VALVE UNIT FOR WELL PIPE
Richard H. Allen, Charleston, W. Va., assignor to Well Service Inc., Charleston, W. Va., a corporation of West Virginia
Filed Aug. 28, 1967, Ser. No. 663,597
Int. Cl. F16k 13/04, 21/04; E21b 41/00
U.S. Cl. 166—224         4 Claims

ABSTRACT OF THE DISCLOSURE

A float valve unit for use in floating and cementing well pipes and which features a releasable float valve assembly installed within a support collar connectible in series with the well pipe. In the event that the float valve becomes clogged, the entire valve assembly can be removed from the collar to clear the well pipe simply by pressurizing the fluid in the well pipe length above the collar to exert a predetermined downward pressure differential across the valve, higher than that which normally exists, to sever a shearable member that normally secures the valve assembly in place within the collar.

BACKGROUND AND SUMMARY OF THE INVENTION

The present invention relates to floating equipment for use in lowering and cementing well pipe and more particularly to a float valve unit having a float valve assembly which in the event of clogging can be released from the surface to clear the well pipe by pressurizing the fluid in the well pipe length above the valve.

It is common within the well servicing industry to employ a check valve, commonly designated as a float valve, to maintain a seal at or near the bottom of a long string of pipe so that when the pipe string is lowered into a well bore, the empty string will have an increased buoyancy and will be partially supported by the hydrostatic pressure of the mud, water, oil or other fluid ordinarily present in the well bore after drilling. By providing a float valve arranged to permit downward flow of fluid through the pipe and to prevent upward fluid flow therethrough, the entire pipe string can be floated down the well to the intended depth and upon arrival at such depth, a cement slurry can be pumped down through the pipe and out through the valve to fill up the spacing between the outside of the pipe and the well bore, with the float valve serving to prevent any reverse flow of cement back up the pipe under the influence of the hydrostatic pressure of uncured cement existing at the lower end of the pipe string.

Conventional prior art float valve units have valve assemblies which are permanently connected by screw threads or welding within housing collars that are coupled to the well pipe, and can perform the same pipe string floatation and cementing functions as the float valve unit of the invention except that when such prior art valve units become clogged they cannot be cleared without considerable difficulty and expense.

When any float valve unit is installed on the lower end of the well pipe, or between pipe sections near the lower end of a pipe string, and the pipe is lowered and suitably positioned in the well bore, frequently during fluid circulation pumping or cementing operations the float valve will become prematurely plugged or blocked by foreign debris clinging to the inside of the well pipe, lost circulation material solids added to the drilling mud in the well bore, and various commonly used solids introduced into the cement slurry used for cementing the outside of the pipe to the well bore. Upon occurrence of such valve plugging, generally all of the well pipe must be removed from the well bore to permit removal of the valve obstruction at the surface, and the pipe string and float valve unit made up again and lowered into the well bore. If premature valve plugging should occur during the cementing operation, it is necessary to drill out the float valve and such cement as is inside the pipe, and then re-cement the well pipe, an extremely hazardous and expensive remedial operation.

The invention provides a novel float valve unit which avoids the need for such hazardous and expensive fix operations in the event of valve plugging, and which permits easy removal from the surface of the entire float valve assembly downwardly and out of its housing collar and any well pipe sections below the collar to clear the entire well pipe length thereby allowing normal continuation and successful completion of fluid or cement pumping operations previously in progress.

Essentially, the invention provides a float valve unit having a hollow collar adapted for connection to the well pipe, a check valve assembly disposed within the collar and operable to restrict the flow of fluid therethrough to a single direction, preferably downward, and means disposed within the collar to releasably connect the valve assembly thereto. This releasable connection means can be varied in accordance with the several embodiments of the invention, but in general can be said to include at least one shearable member having material properties and a cross sectional area which will shear or otherwise sever upon occurrence of a predetermined fluid pressure differential across the valve assembly to release same for removal out of the collar and well pipe to clear same.

This shearable member can be a ring, a pin, or any other fastening or locking member that will hold the valve assembly in a generally fixed position within the collar for performing its normal functions, and which will sever at the design valve overpressure corresponding to a plugged valve condition. While as described herein such member or plurality thereof are designated as shearable members, it is to be understood that the invention is not restricted to any specific failure mode such as shear, but contemplates the use of such members as may sever to release the valve assembly through tensile rupture or bending fracture. The only basic criterion upon such expendable releasable connection elements is that they fail in such a way at the specified overpressure as to allow the valve assembly to move freely away from its originally installed position and out of the collar under the influence of gravity with an initial assistance from such overpressure forces.

The valve assembly need not be directly connected to the collar itself by a shearable member, but in accordance with a preferred embodiment of the invention, the overall releasable connection means can include parts that remain within the collar after the valve assembly has been sheared out. For example, the releasable connection means can include a seat body connected to the collar by a substantially permanent fastening means, and disposed to receive a cementing top plug passed down through the well pipe from the surface, and the valve assembly is connected to the seat body by one or more shearable members. Thus, upon plugging of the valve, a fluid pressure differential will build up until at the specified overpressure the shearable member, or all shearable members sever to release the entire valve assembly for ejection from the collar and pipe, and the seat body will remain inside the collar to receive the cementing plug at completion of the cementing operation.

It is therefore, an object of the invention to provide a float valve unit for a well pipe which will seal the pipe for increased buoyancy during the lowering thereof into a well bore, and which will permit the flow of cement slurry and other fluids downwardly through the pipe and prevent reverse fluid flow up the pipe.

Another object of the invention is to provide a float valve unit as aforesaid having a releasably connected valve assembly which, upon the occurrence of a predetermined pressure differential acting upon it, will automatically separate from the remainder of the unit and be removed to clear the well pipe.

A further object of the invention is to provide a float valve unit as aforesaid having means installed within the unit to remain therewith, even if the valve assembly should be removed, to receive a plug passed down the well pipe.

Still another and further object of the invention is to provide a float valve unit as aforesaid which is relatively simple and economical to construct, and highly reliable.

Other and further objects and advantages of the invention will become apparent from the following description of preferred embodiments of the invention and the accompanying drawing.

BRIEF DESCRIPTION OF THE DRAWING

In the drawing:

FIG. 1 is an elevation view, partly in section, of a float valve unit according to a preferred embodiment of the invention as installed in a typical well pipe.

FIG. 2 is an elevation view, partly in section, of a float valve unit according to another embodiment of the invention as installed in a typical well pipe.

FIG. 3 is an elevation view, partly in section, of a float valve unit according to a further embodiment of the invention.

DESCRIPTION OF THE PREFERRED EMBODIMENTS OF THE INVENTION

The float valve unit 10 shown by FIG. 1 has a generally cylindrical hollow collar 11 open at both its upper end 12 and its lower end 13 which are respectively internally threaded and externally threaded, the upper end for direct connection to externally threaded well pipe section 14A, and the lower end for connection to a similarly threaded well pipe section 14B via a threaded coupling 15.

Hollow collar 11 is provided with an internal shoulder 16, preferably having an inside diameter approximately equal to that of well pipe sections 14A and 14B or slightly less and three internal ring grooves 17, 18 and 19.

A generally cylindrical valve assembly 20 is installed within collar 11, the upper end of valve assembly 20 being positioned to abut against shoulder 16, and the lower end portion of assembly 20 being secured to collar 11 by means of a shearable ring 21, which is preferably slit so that it can be compressed for insertion into collar groove 19 and then released to assure a normal configuration in which it is retained by groove 19 and abuts against a circumferential shoulder 22 provided on the lower end of assembly 20.

Thus, shear ring 21 serves to normally prevent valve assembly 20 from being forced downward and out of collar 11 by pressure differential forces that normally exist when valve assembly 20 functions to permit downward fluid flow from upper well pipe section 14A to lower well pipe section 14B and out through the open bottom thereof, as for example, during cementing operations.

Collar shoulder 16 is expediently designed to take up substantially all of the upward thrust load exerted upon assembly 20 and for such purpose a limited axial clearance is provided between shoulder 22 and ring 21, so that the shear ring 21 need only be designed to sustain a downward thrust on assembly 20 up to that corresponding to a predetermined release pressure. For example, the upward thrust acting upon assembly 20 due to the hydrostatic pressure of a column of uncured cement 24 in well bore 25 may be much higher than the desired release pressure force, and by designing collar shoulder 16 to take the upward thrust of assembly 20, the ring 21 can be dimensioned to shear at a downward force which is less than the maximum anticipated upward force on assembly 20.

Ring 21 is expediently designed to shear and release the valve assembly 20 at a net downward pressure differential thereacross approximately 50 percent higher than that which occurs during normal operation when the fluid F is pumped down through the unit 10.

To seal against any fluid leakage past valve assembly 20, a pair of O-rings 31 and 32 seated in grooves 17 and 18 respectively are provided.

The valve assembly 20 is essentially a check valve device which has a captive ball 33 which can rest against a plurality of angularly spaced-apart ribs 34 to permit downward circulation of the fluid F, which can be cement slurry, water, etc., through the orifice 35. The ball 33 itself is preferably fully buoyant so that in the absence of any downward fluid F circulation, it will rise against seat 36 to seal orifice 35 and thereby prevent any reverse fluid flow upward therethrough. Actually, ball 33 can be somewhat less than completely buoyant, if some transient reverse flow can be tolerated, provided that its buoyancy is not so low that the tolerable reverse flow will not sweep it up against seat 36. In such case, once ball 33 is against seat 36, it will be held there by the upward fluid pressure differential that would otherwise effect such reverse flow.

It should be noted that the invention is not necessarily limited to the use of ball-type check valves and as desired other types of valve designs can be incorporated into the valve assembly 20 in lieu of those specifically shown and described herein.

Insofar as the choice of a particular shearable member is concerned, the invention is not restricted to the use of a shear ring 21, and as desired one or more shear pins 37 such as are shown in FIG. 2, or shearable threads 38 as shown in FIG. 3 can be substituted.

While as previously mentioned, the ball 33 can be fully buoyant, the overall valve assembly 20 is not, and is preferably weighted, as with concrete, so that upon being released will be easily pushed down out of collar 11 and lower pipe section 14B and will fall to the bottom of the well bore 25.

FIG. 2 shows a float valve unit 10' wherein the releasable connecting means employed has a seat body 41 that is connected to collar 11' in a substantially permanent manner, as by nonshearable threads 42, and serves to receive a cementing plug 43 passed down from the surface through pipe section 14A at the termination of cementing operations. Seat body 41 is preferably fabricated from an easily drillable material such as aluminum, so that it can be removed if desired.

Valve assembly 20' functions in a similar manner to valve assembly 20, and has a ball 33' held captive by a plurality of cage bars 44, and urged against a seat 36' by a spring 45, to permit downward fluid flow through orifice 35' and to check reverse flow therethrough.

Instead of being connected directly to collar 11' by a shearable member, valve assembly 20' is connected to seat body 41 by a plurality of shearable pins 37. Seat body 41 is provided with an internal shoulder 16' that serves to take up such upward forces as are exerted upon valve assembly 20' by fluid underneath it, and functions just as in the case of the internal shoulder 16 to relieve the shearable pins 37 of upward forces, and allow them to be designed purely on the basis of the selected downward pressure differential for valve assembly 20' ejection. Pins 37 are so dimensioned and designed to shear (all of them) and release valve assembly 20' whenever the net downward pressure differential thereacross reaches a prescribed value, expediently 50 percent higher than the normal down pumping value.

Upon such occurrence, valve assembly 20' is ejected to the bottom of the well bore 25, and seat body 41 remains within collar 11' to receive cementing plug 43.

As exemplified by FIG. 3, a shearable threaded part 38 can be provided on valve body 20″ for meshing engagement with a similarly threaded part 47 on collar 11″ to normally hold valve assembly 20″ in a given fixed position with respect to collar 11′. Threads 38 are dimensioned to shear at the prescribed downward overpressure to release valve assembly 20″ for ejection to the bottom of the well bore.

From the foregoing, it can be appreciated by the artisan that the invention provides a valve assembly 20, 20′, 20″ which is held within a collar 11, 11′, 11″ to function as a reverse flow check valve under normal downward fluid circulating conditions, and which will, upon clogging or occurrence of any other condition which increases the downward flow resistance above a predetermined value, be ejectable simply by increasing the pressurization on the fluid within the upper well pipe section 14A. Automatic valve assembly ejection can be realized simply by using pressurization equipment (not shown) at the surface which is capable of producing the design shearing pressure at the level of the valve assembly, so that no auxiliary pressurizing equipment is needed.

Consequently, with the invention, the entire well pipe length can be cleared at any time that the valve assembly should become blocked.

Preferably the valve assembly 20, 20′, 20″ is of a diameter which will allow it to pass freely through the size of well pipe used, so that if a lower well pipe section 14B is used, there will be no difficulty encountered in clearing both the collar 11, 11′, 11″ and such pipe section 14B. However, the valve assembly 20, 20′, 20″ can be larger in diameter than the well pipe in cases where no lower well pipe section 14B is used, provided that the minimum diameter opening in the collar 11, 11′, 11″ is sufficient to allow passage of the valve assembly 20, 20′, 20″ out through the lower end thereof.

From the foregoing, it can be appreciated by the artisan that the invention is susceptible of numerous obvious modifications and variations to suit the needs of a particular application. However, the invention is intended to be limited only by the following claims in which I have endeavored to claim all inherent novelty.

What is claimed is:

1. A float valve unit for a well pipe, which comprises a hollow collar adapted for connection to the well pipe, a valve assembly disposed within said collar including a valve member disposed to permit fluid flow through said collar in the downward direction and to prevent fluid flow through said collar in the upward direction, and means disposed within said collar to releasably connect said valve assembly thereto, said releasable connecting means including a threaded part on said valve assembly and a similarly threaded part on said collar disposed for meshing engagement with the threaded part on the valve assembly to normally secure same in a given position with respect to the collar, one of said threaded parts being dimensioned to shear at a predetermined net downward fluid pressure differential across said valve assembly to release same for downward movement out of said collar.

2. The float valve unit according to claim 1, including retainer means disposed within said collar and supported thereby for engagement with said valve assembly to resist upward forces acting thereupon and thereby relieve said shearable member of such upward force.

3. The float valve unit according to claim 1 including a seat body connected to said collar and disposed to receive a plug passed through the well pipe into said collar.

4. The float valve unit according to claim 3 including means defining an internal shoulder within said seat body disposed for abutting engagement with said valve assembly to resist upward forces acting thereupon and thereby relieve said shearable member of such upward forces.

References Cited
UNITED STATES PATENTS

| | | | |
|---|---|---|---|
| 1,631,509 | 6/1927 | Baker | 137—515.3 |
| 2,249,511 | 7/1941 | Westall | 166—28 |
| 2,300,854 | 11/1942 | Allen et al. | 166—224 X |
| 2,662,602 | 12/1953 | Schnitter | 166—225 X |
| 2,751,023 | 6/1956 | Conrad | 166—225 |
| 2,890,861 | 6/1959 | Cook | 175—318 |

CHARLES E. O'CONNELL, Primary Examiner

IAN A. CALVERT, Assistant Examiner

U.S. Cl. X.R.

137—71, 515.3, 515.5